United States Patent
Wood et al.

(10) Patent No.: US 8,016,018 B2
(45) Date of Patent: *Sep. 13, 2011

(54) METHOD OF MANUFACTURING A METAL MATRIX COMPOSITE

(75) Inventors: Thomas D. Wood, Houghton, MI (US);
Neil Anderson, Calumet, MI (US);
Andrew Halonen, Calumet, MI (US)

(73) Assignee: Century, Inc., Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/882,159

(22) Filed: Sep. 14, 2010

(65) Prior Publication Data

US 2011/0061830 A1 Mar. 17, 2011

Related U.S. Application Data

(63) Continuation of application No. 12/174,986, filed on Jul. 17, 2008, now Pat. No. 7,793,703.

(60) Provisional application No. 61/132,281, filed on Jun. 17, 2008.

(51) Int. Cl.
*B22D 19/14* (2006.01)

(52) U.S. Cl. .......................... 164/97; 164/98

(58) Field of Classification Search .................. 164/97, 164/98
See application file for complete search history.

(56) References Cited

U.S. PATENT DOCUMENTS

| | | | |
|---|---|---|---|
| 2,262,242 A | 11/1941 | Lenox | |
| 3,002,433 A | 10/1961 | Dunlap | |
| 3,005,259 A | 10/1961 | Benya et al. | |
| 3,007,553 A | 11/1961 | Sinclair et al. | |
| 3,066,766 A | 12/1962 | Minor et al. | |
| 3,090,114 A | 5/1963 | Sinclair | |
| 3,126,306 A | 3/1964 | Sherman | |
| 3,697,718 A | 10/1972 | VonHollen et al. | |

(Continued)

FOREIGN PATENT DOCUMENTS

JP 6340475 12/1994

(Continued)

OTHER PUBLICATIONS

Article entitled "Liquid State Fabrication of Metal Matrix Composites" from the website created by Dr. Dmitri Kopeliovich; dated Feb. 4, 2008; http://www.substech.com/dokuwiki/doku.php? id=liquid_state_fabrication_of_metal_matrix_composites.

(Continued)

*Primary Examiner* — Kuang Lin
(74) *Attorney, Agent, or Firm* — Howard & Howard Attorneys PLLC

(57) ABSTRACT

The present invention relates to a metal matrix composite (MMC) and the method of manufacturing the MMC. The MMC includes a preform formed from a composition having ceramic particles and ceramic fibers. The metal matrix composite also includes a support element formed from a metal where the metal impregnates through the preform. The method of forming the MMC includes the step of extruding the composition through a multi-screw extruder to form an extrudate. The method also includes the step of heating the preform and positioning the preform within a mold. The method further includes the step of heating the metal for forming a molten metal and injecting the molten metal into a cavity of the mold under pressure for infiltrating the preform with the molten metal. The method also includes cooling the molten metal to solidify the molten metal and form the metal matrix composite and removing the metal matrix composite from the mold.

23 Claims, 5 Drawing Sheets

U.S. PATENT DOCUMENTS

| | | | |
|---|---|---|---|
| 3,841,448 | A | 10/1974 | Norton, Jr. |
| 4,026,690 | A | 5/1977 | McClellan |
| 4,141,481 | A | 2/1979 | Van Petten |
| 4,266,638 | A | 5/1981 | Peterson et al. |
| 4,312,672 | A | 1/1982 | Blahak et al. |
| 4,331,628 | A | 5/1982 | Ziegler |
| 4,448,833 | A | 5/1984 | Yamaguchi et al. |
| 4,577,734 | A | 3/1986 | Williams |
| 4,679,681 | A | 7/1987 | Creydt et al. |
| 4,702,877 | A | 10/1987 | Davis, Jr. |
| 4,710,252 | A | 12/1987 | Kadunce |
| 4,909,301 | A | 3/1990 | Riordan et al. |
| 5,002,836 | A | 3/1991 | Dinwoodie et al. |
| 5,068,076 | A | 11/1991 | Weaver et al. |
| 5,108,964 | A | 4/1992 | Corbett et al. |
| 5,112,553 | A | 5/1992 | Nedzu |
| 5,153,057 | A | 10/1992 | Corbett et al. |
| 5,188,787 | A | 2/1993 | King et al. |
| 5,325,941 | A | 7/1994 | Farinacci et al. |
| 5,335,712 | A | 8/1994 | Corbett et al. |
| 5,342,463 | A | 8/1994 | Addeo et al. |
| 5,382,399 | A | 1/1995 | Moret de Rocheprise et al. |
| 5,433,511 | A | 7/1995 | Wei |
| 5,458,181 | A | 10/1995 | Corbett et al. |
| 5,511,603 | A | 4/1996 | Brown et al. |
| 5,529,620 | A | 6/1996 | Corbett et al. |
| 5,586,963 | A | 12/1996 | Lennon et al. |
| 5,591,292 | A | 1/1997 | Blomqvist |
| 5,637,168 | A | 6/1997 | Carlson |
| 5,662,145 | A | 9/1997 | Stagg |
| 5,798,013 | A | 8/1998 | Brandenburger |
| 5,900,194 | A | 5/1999 | Ashton |
| 6,169,048 | B1 | 1/2001 | Sjogren et al. |
| 6,180,258 | B1 | 1/2001 | Klier |
| 6,306,235 | B1 | 10/2001 | Henderson |
| 6,344,160 | B1 | 2/2002 | Holtzberg |
| 6,413,069 | B2 | 7/2002 | Oono et al. |
| 6,460,597 | B1 | 10/2002 | McCullough et al. |
| 6,488,802 | B1 | 12/2002 | Levingston et al. |
| 6,503,441 | B2 | 1/2003 | Corman et al. |
| 6,530,458 | B1 | 3/2003 | Rau, III |
| 6,537,405 | B1 | 3/2003 | Henderson et al. |
| 6,539,644 | B1 | 4/2003 | Araya |
| 6,548,000 | B1 | 4/2003 | Gobled et al. |
| 6,796,365 | B1 | 9/2004 | McCullough et al. |
| 6,989,067 | B2 | 1/2006 | Armstrong, Jr. et al. |
| 7,052,637 | B1 | 5/2006 | Strand et al. |
| 7,126,257 | B2 | 10/2006 | Kampe et al. |
| 7,175,796 | B2 | 2/2007 | Ehnert |
| 7,208,108 | B2 | 4/2007 | Otsuka et al. |
| 7,216,746 | B2 | 5/2007 | Yamamoto et al. |
| 7,290,506 | B2 | 11/2007 | Rau, III et al. |
| 7,357,976 | B2 | 4/2008 | Yamamura et al. |
| 7,793,703 | B2 | 9/2010 | Wood et al. |
| 2001/0000333 | A1 | 4/2001 | Nakao et al. |
| 2003/0092557 | A1 | 5/2003 | Aichele et al. |
| 2003/0180172 | A1 | 9/2003 | Oda |
| 2004/0035547 | A1 | 2/2004 | Grether |
| 2004/0048095 | A1 | 3/2004 | Crocco et al. |
| 2004/0118547 | A1 | 6/2004 | Brown et al. |
| 2004/0141405 | A1 | 7/2004 | Blach et al. |
| 2004/0145095 | A1 | 7/2004 | McCollum et al. |
| 2004/0173291 | A1 | 9/2004 | Rozenoyer et al. |
| 2005/0011591 | A1 | 1/2005 | Murty et al. |
| 2005/0183909 | A1 | 8/2005 | Rau, III et al. |
| 2005/0217950 | A1 | 10/2005 | Jolley, Jr. et al. |
| 2005/0241434 | A1 | 11/2005 | Persson et al. |
| 2005/0253302 | A1 | 11/2005 | Nun et al. |
| 2005/0260408 | A1 | 11/2005 | Anand et al. |
| 2006/0027429 | A1 | 2/2006 | Knight et al. |
| 2006/0057356 | A1 | 3/2006 | Yamamura et al. |
| 2006/0243421 | A1 | 11/2006 | Zhang et al. |
| 2006/0263574 | A1 | 11/2006 | Tsunekawa et al. |
| 2006/0293454 | A1 | 12/2006 | Nadella et al. |
| 2006/0293457 | A1 | 12/2006 | Nadella et al. |
| 2007/0131374 | A1 | 6/2007 | Zhang et al. |
| 2007/0170016 | A1 | 7/2007 | Yamamoto et al. |
| 2008/0135359 | A1 | 6/2008 | Basirico et al. |
| 2008/0220234 | A1 | 9/2008 | Ko et al. |
| 2008/0264595 | A1 | 10/2008 | Bushby |
| 2008/0310989 | A1 | 12/2008 | Tschofen |

FOREIGN PATENT DOCUMENTS

| | | | |
|---|---|---|---|
| WO | 2004018718 | | 3/2004 |
| WO | 2007033378 | A1 | 3/2007 |

OTHER PUBLICATIONS

Article entitled "Emerging Applications of Ceramic and Metal Matrix Composites" from the website About.com: Composites/Plastics; dated Sep. 19, 2005; http://composite.about.com/od/aboutcompositesplastics/1/aa030205.htm.

Article entitled "Optimization of the Squeeze Casting Process for Aluminum Alloy Parts" from the Office of Industrial Technologies Energy Efficiency and Renewable Energy, US Department of Energy; dated Sep. 10, 2006; www.dmseg5.case.edu/Groups/CMPL/projects/cwru_optimize_al.pdf.

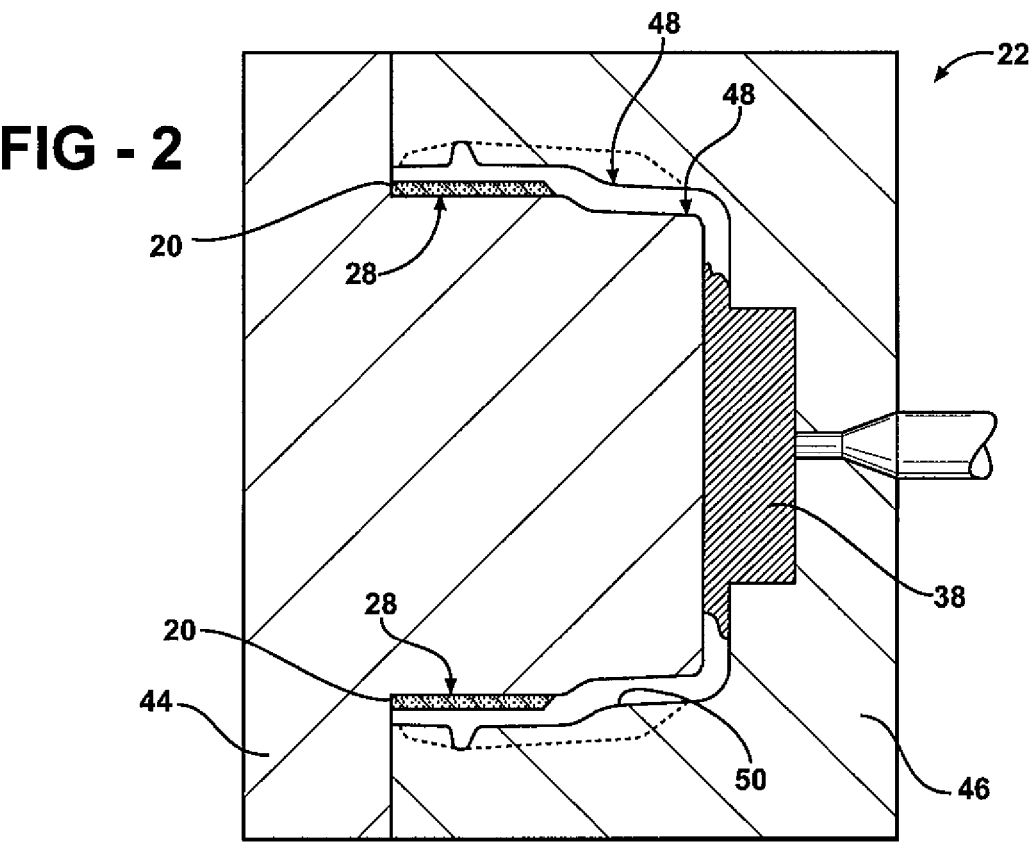
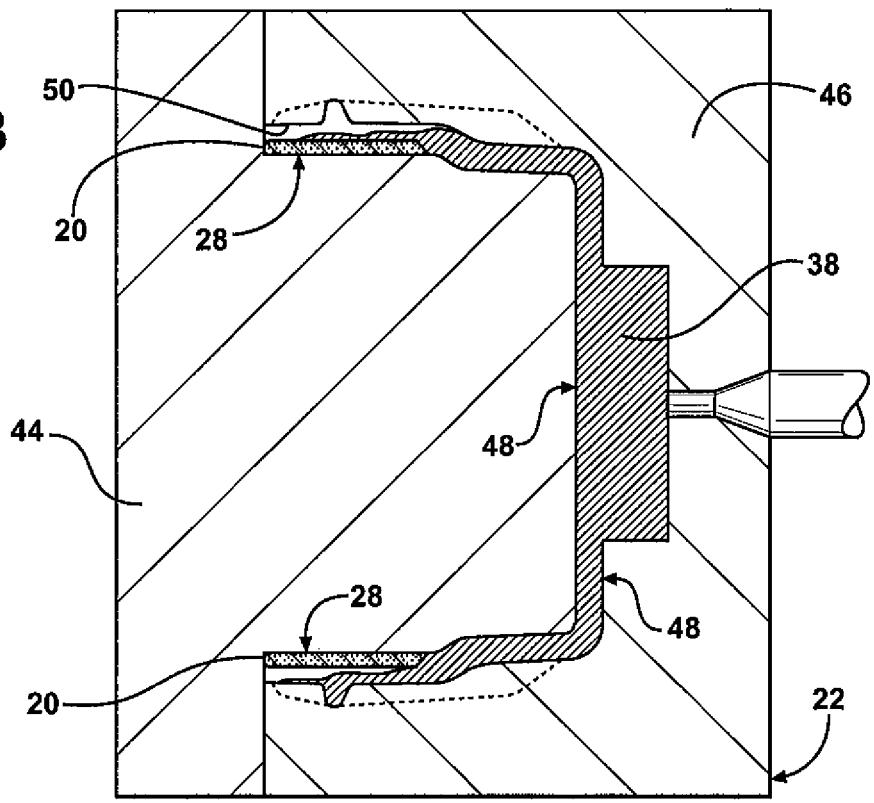

METHOD OF MANUFACTURING A METAL MATRIX COMPOSITE

RELATED APPLICATIONS

This application is a continuation of U.S. patent application Ser. No. 12/174,986, filed on Jul. 17, 2008, which is now U.S. Pat. No. 7,793,703, which in turn claims priority to and all advantages of U.S. Provisional Patent Application No. 61/132,281, which was filed on Jun. 17, 2008, the disclosure(s) of which is/are hereby incorporated by reference.

BACKGROUND OF THE INVENTION

1. Field of the Invention

The present invention relates to a method of manufacturing a metal matrix composite and a composition of the metal matrix composite.

2. Description of the Related Art

Metal matrix composites (MMCs) are composite materials that comprise at least two constituents, one being a primary metal and the other being a different secondary metal or another material, such as a ceramic article or organic compound. As compared to monolithic materials comprising a single constituent, MMCs have a higher strength-to-density ratio, a higher stiffness-to-density ratio, better fatigue resistance, and higher strength at elevated temperatures. MMCs also have a higher wear resistance than monolithic materials. As such, MMCs are typically useful for applications requiring wear resistance and strength, e.g., brakes.

MMCs are produced by augmenting the primary metal with the secondary metal or other material, which are typically some type of reinforcing material. The metals used for the primary metal and the reinforcing material are typically chosen to optimize the desired mechanical and physical properties of the MMCs. Numerous combinations of metals and reinforcing materials are known in the art. Examples of an effective metal as the primary metal are aluminum, magnesium, titanium, copper, zinc, and superalloys. Examples of effective reinforcing materials comprise boron carbide, silicon carbide, alumina, and graphite, and are available in the form of continuous fibers, discontinuous fibers, particles, and whiskers.

One method of producing MMCs includes impregnating or infiltrating a preform of the reinforcing materials with the primary metal. The preform is often a fabric or prearranged fibrous configuration of the reinforcing materials that is produced prior to metal infiltration.

Many existing preforms, however, suffer from fatigue and/or failure in non-reinforced dimensions and do not exhibit uniform strength in three dimensions. Additionally, existing preforms typically comprise small reinforcing materials, which enable consistent mixing during the formation of the preform. However, consistent mixing often becomes difficult as the size of the reinforcing materials decreases. Small reinforcing materials often limit the mechanical and physical properties, such as wear resistance, of the preform and in turn the MMCs.

Many existing preforms also exhibit inconsistent density as a result of inconsistent mixing. Since consistent mixing ideally includes both dispersion of reinforcing material agglomerates and uniform distribution of reinforcing materials throughout the preform and dispersion of reinforcing materials to prevent agglomerations, inconsistent mixing results in nonuniform distribution of reinforcing materials in existing preforms and contributes to preforms having inconsistent density, physical properties, and performance. Preforms having inconsistent density wear more readily and are not useful for applications requiring high wear resistance. Additional external reinforcing elements must often be added to existing preforms after formation to remedy these performance issues, which increases production costs of the MMCs.

Further, many existing preforms are heavy due to the required additional external reinforcing elements. Heavy preforms are often not suitable for applications requiring lightweight components, such as automotive or aeronautical applications.

Finally, many existing preforms suffer from weak points caused by entanglement and conglomeration of reinforcing materials. Preforms including entanglements and conglomerations do not exhibit sufficient strength and stiffness. MMCs formed from preforms including entanglement and conglomeration also suffer from inadequate metal infiltration due to blockages caused by such entanglement and conglomeration of reinforcing materials.

Due to the inadequacies of existing preforms and the method of manufacturing MMCs, there remains an opportunity to provide a preform that is easy to produce and light weight that meets the strength requirements of preforms used in metal matrix composites.

SUMMARY OF THE INVENTION AND ADVANTAGES

The present invention relates to a metal matrix composite. The metal matrix composite includes a preform formed from a composition having ceramic particles and ceramic fibers. The ceramic fibers have an aspect ratio of greater than 3:1 and the ceramic fibers are substantially randomly oriented in three dimensions. The metal matrix composite also includes a support element formed from a metal. The metal of the support element impregnates through the preform.

The present invention also relates to a method of forming the metal matrix composite. The method includes the step of extruding the composition through a multi-screw extruder to form an extrudate. The multi-screw extruder substantially randomly orients the ceramic fibers in three dimensions as the composition is extruded through the multi-screw extruder. The method also includes forming the extrudate to a desired configuration for defining the preform, drying the preform, heating the preform to remove an organic binder and form an open-cell matrix, heating the preform for strengthening the preform and positioning the preform within a portion of a cavity of a mold. The method further includes the step of heating the metal above a melting point of the metal for forming a molten metal and injecting the molten metal into the cavity of the mold under pressure for infiltrating the preform with the molten metal. The method also includes the step of cooling the molten metal to below the melting point to solidify the molten metal and form the metal matrix composite and removing the metal matrix composite from the mold.

Therefore, the ability to use a multi-screw extruder for mixing the composition of the preform ensures consistent mixing and uniform distribution of reinforcing materials for preventing blockages to ensure proper metal infiltration. The method and metal matrix composite of the subject invention result in substantially randomly oriented ceramic fibers having an aspect ratio of greater than 3:1 in three dimensions for resisting fatigue and/or failure in all dimensions. The method produces a lightweight ceramic preform that meets or exceeds the strength requirements for high wear resistance applications and the metal matrix composite does not require any type of external reinforcement element.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a cross-sectional view of the mold of FIG. 1 with the male half abutting the female half to define a cavity with the preform disposed within a portion of the cavity and a molten metal beginning to fill the cavity;

FIG. 3 a cross-sectional view of the mold of FIG. 1 with the molten metal further filling the cavity;

DETAILED DESCRIPTION OF THE INVENTION

Figure 1:
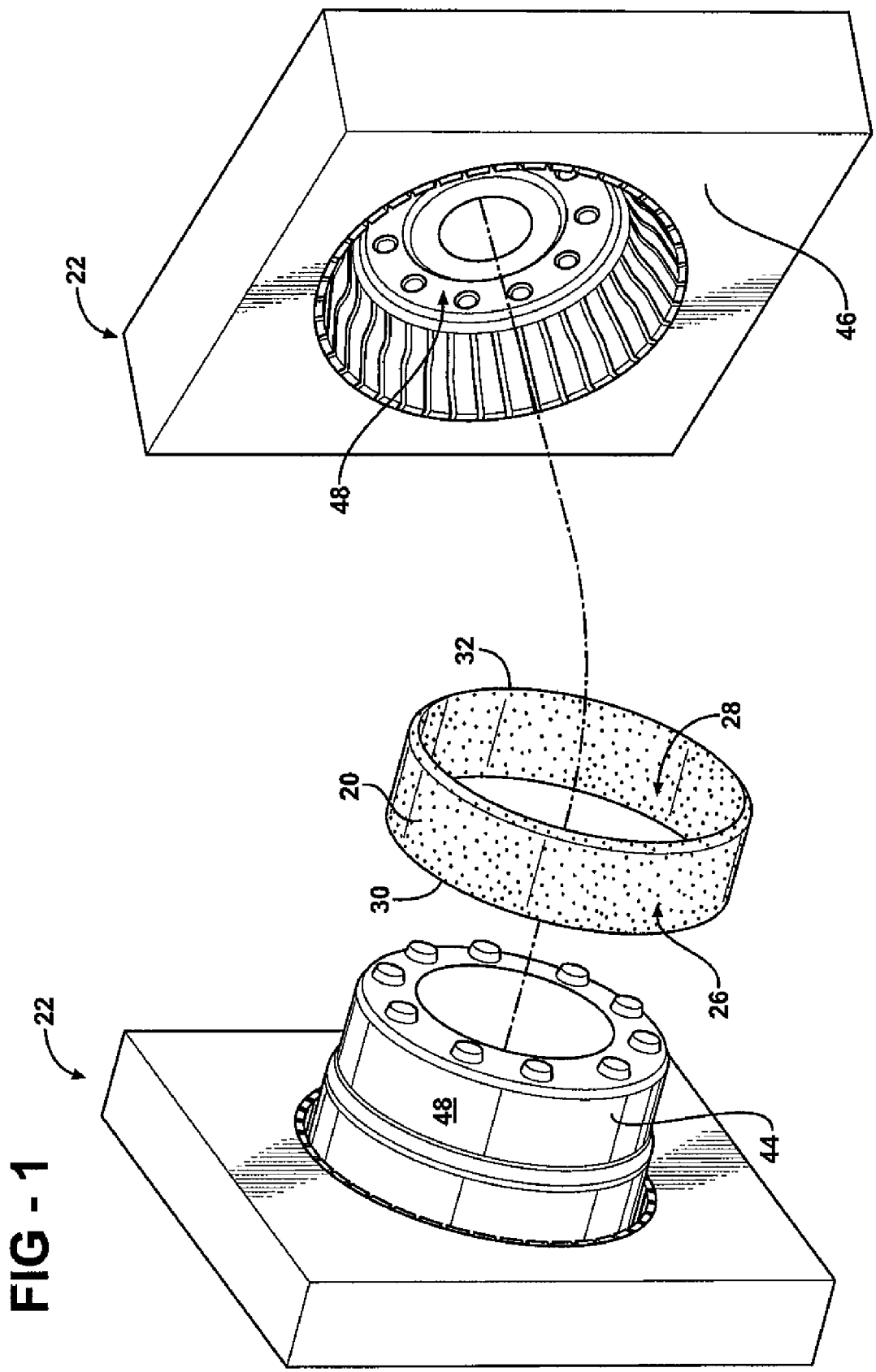
FIG. 1 is an exploded view of a mold having a male half and a female half with a ceramic preform disposed therebetween.

Referring to the Figures, wherein like numerals indicate like or corresponding parts throughout the several views, a preform 20 is generally shown in FIG. 1 in spaced relationship to a mold 22. The preform 20 is designed to be part of a metal matrix composite 24 as will be discussed in greater detail below. The preform 20 and metal matrix composite 24 are typically useful for vehicle brake applications requiring excellent strength and wear resistance at elevated temperatures. However, it is to be appreciated that the preform 20 and metal matrix composite 24 of the present invention can have applications beyond brakes and/or vehicle applications, such as in aeronautical and aerospace applications.

The preform 20 is formed from a composition having ceramic particles and ceramic fibers. In the preferred embodiment, a multi-screw extruder is utilized for mixing the ceramic particles and ceramic fibers. The ceramic fibers are typically included in the preform 20 to reduce the density, enhance metal infiltration, and optimize strength of the preform 20 for use in the metal matrix composite 24, as set forth in more detail below. The preform 20 has an outer surface 26 and an inner surface 28 with an outward end 30 and an inward end 32. The inward end 32 includes a chamfer, the purpose of which will be discussed in greater detail below.

The ceramic fibers typically comprise an element from period 2, 3, 4, or 5 of the periodic table of the elements. Typically, the ceramic fibers comprise aluminum, silicon, oxygen, zirconium, or carbon. The ceramic fibers are typically selected from the group of alumina-silica fibers, alumina-silica-zirconia fibers, carbon-graphite fibers, and combinations thereof. Carbon-graphite fibers are typically selected for applications requiring high strength.

In one embodiment, the ceramic fibers have an aspect ratio of greater than 3:1. In another embodiment, the ceramic fibers have an aspect ratio of greater than or equal to 5:1. In yet another embodiment, the ceramic fibers have an aspect ratio of greater than or equal to 10:1. It is to be appreciated that the term aspect ratio means a ratio of the longer dimension, i.e., length, of the ceramic fibers to the shorter dimension, i.e., diameter, of the ceramic fibers. The ceramic fibers typically have a length of from 5 to 500 µm, more typically from 50 to 250 µm. The ceramic fibers typically have a diameter of from 1 to 20 µm, more typically from 2 to 5 µm. Without intending to be limited by theory, it is believed that ceramic fibers having an aspect ratio of greater than 3:1 decrease the density of the preform 20 and optimize an infiltration potential of the preform 20 by spacing out the ceramic particles. As discussed in greater detail below and as shown in FIGS. 6-9, the ceramic fibers define a void space 36 between the ceramic particles for allowing a molten metal 38 to impregnate through the preform 20. As set forth below, the molten metal 38 flows between the ceramic particles and substantially infiltrates the preform 20 during fabrication of the metal matrix composite 24.

The ceramic fibers are substantially randomly oriented in three dimensions in the preform 20. It is to be appreciated that the term substantially means that greater than 90 out of 100 ceramic fibers are randomly oriented in three dimensions in the preform 20. It is further to be appreciated that the term randomly oriented means that adjacent ceramic fibers are disposed in different dimensions and that adjacent ceramic fibers are free from a pattern of alignment. More specifically, adjacent ceramic fibers oriented in different dimensions are typically present in the preform 20 in an amount of greater than 85 parts by volume based on 100 parts by volume of the preform 20. Further, adjacent ceramic fibers oriented in the same dimension are typically present in the preform 20 in an amount of from 0.1 to 5 parts by volume based on 100 parts by volume of the preform 20. Without intending to be limited by theory, it is believed that ceramic fibers substantially randomly oriented in three dimensions provide the preform 20 with uniform strength in three dimensions. As such, the preform 20 of the present invention is typically free from fatigue and/or failure in a third, non-reinforced dimension as compared to preforms 20 with ceramic fibers oriented in only two dimensions.

The ceramic fibers are typically substantially homogeneously dispersed in the preform 20. It is to be appreciated that the term substantially means greater than 90 out of 100 ceramic fibers in the preform 20 are homogeneously dispersed in the preform 20. Further, it is to be appreciated that the term homogeneously dispersed means that greater than 85% by volume of the ceramic fibers in the preform 20 are uniformly distributed on a scale of twice the diameter of the ceramic fiber. That is, greater than 85 out of 100 ceramic fibers are spaced at least one ceramic fiber diameter away from an adjacent ceramic fiber. Without intending to be limited by theory, it is believed that ceramic fibers that are substantially homogeneously dispersed in the preform 20 provide the preform 20 with uniform density and, consequently, uniform strength. That is, the preform 20 is typically free from entanglements and conglomerations of ceramic fibers that cause weak points that typically decrease strength and stiffness of the preform 20. Since the preform 20 exhibits uniform density, it is typically unnecessary to add additional ceramic fibers to the preform 20 after formation to remedy inconsistent density, thereby minimizing production costs of the preform 20. Additionally, since the preform 20 of the present invention is typically free from blockages caused by entanglements and conglomerations of ceramic fibers, the preform 20 of the present invention also minimizes infiltration blockages caused by entanglement and conglomeration and enables excellent metal infiltration for efficient production of the metal matrix composite 24.

An uncured preform is typically cured or sintered to form a cured preform, i.e., the preform 20, that has been cured or sintered. During curing or sintering, any liquid components of the uncured preform typically burn off, and solids remain in the preform 20. That is, after curing or sintering, solids are typically present in the preform 20 in an amount of from 20 to 50 parts by volume based on 100 parts by volume of the preform 20. Solids are more typically present in the preform 20 in an amount of from 30 to 40 parts by volume based on 100 parts by volume of the preform 20. Air is typically present in the preform 20 in an amount of from 50 to 80 parts by volume based on 100 parts by volume of the preform 20. Air is more typically present in the preform 20 in an amount of from 60 to 70 parts by volume based on 100 parts by volume of the preform 20.

The ceramic fibers are typically present in the uncured preform in an amount of from 5 to 25 parts by weight based on 100 parts by weight of solids in the uncured preform. The ceramic fibers typically remain as solids in the preform 20 after curing or sintering. That is, the ceramic fibers are typically present in the preform 20 in an amount of from 3 to 15 parts by volume based on 100 parts by volume of the preform 20. The ceramic fibers are more typically present in the preform 20 in an amount of from 5 to 10 parts by volume based on 100 parts by volume of the preform 20. A specific example of a ceramic fiber is an alumina-silica fiber, commercially available from Thermal Ceramics Inc. of Atlanta, Ga.

The ceramic particles typically provide the preform 20 with excellent stiffness and wear resistance and typically comprise an element from period 2, 3, or 4 of the periodic table of the elements. The ceramic particles more typically comprise an element from period 2 or 3 of the periodic table of the elements. Typically, the ceramic particles comprise silicon, oxygen, carbon, aluminum, or boron. The ceramic particles are typically selected from the group of silicon carbide, alumina, boron carbide, and combinations thereof.

The ceramic particles typically each have a reference dimension of from 5 to 50 μm, more typically 5 to 30 μm. One skilled in the art typically selects ceramic particles having a reference dimension of from 5 to 10 μm, i.e., a smaller ceramic particle, for applications requiring high strength and stiffness. In contrast, one skilled in the art typically selects ceramic particles having a reference dimension of from 10 to 30 μm, i.e., a larger ceramic particle, for applications requiring high wear resistance. One skilled in the art typically combines smaller ceramic particles and larger ceramic particles for applications requiring high strength, stiffness, and wear resistance.

The ceramic particles are typically present in the uncured preform in an amount of from 50 to 75, more typically 60 to 70 parts by weight based on 100 parts by weight of solids in the uncured preform. The ceramic particles typically remain as solids in the preform 20 after curing or sintering. That is, the ceramic particles are typically present in the preform 20 in an amount of from 15 to 30 parts by volume based on 100 parts by volume of the preform 20. The ceramic particles are more typically present in the preform 20 in an amount of from 22 to 28 parts by volume based on 100 parts by volume of the preform 20. A specific example of a ceramic particle is silicon carbide, commercially available from Washington Mills of Niagara Falls, N.Y.

The preform 20 can further comprise a binder component. Without intending to be limited by theory, it is believed that the binder component provides the uncured preform with strength. The binder component typically comprises an organic binder and an inorganic binder. More specifically, without intending to be limited by theory, it is believed that the organic binder provides an uncured ceramic article, i.e., the uncured preform, with strength, whereas the inorganic binder provides a cured preform, i.e., the preform 20, with strength.

The organic binder of the binder component typically comprises a first component and a second component. The first component is typically a starch. Without intending to be limited by theory, it is believed that the first component provides the uncured preform with strength and reduces adhesion of the second component. The first component is typically present in the uncured preform in an amount of from 1 to 10 parts by weight based on 100 parts by weight of solids in the uncured preform. A specific example of a first component is starch, commercially available as Westar 3+ Cationic Starch from Wesbond Corporation of Wilmington, Del.

The second component of the organic binder typically comprises a cellulose ether. The cellulose ether typically exhibits reverse thermal gelation and provides lubricity during formation of the uncured preform. Without intending to be limited by theory, it is believed that the cellulose ether also typically provides surface activity, plasticity, uniform rheology, and uniform distribution of air during formation of the uncured preform. It is also believed that the cellulose ether also typically provides the uncured preform with strength. The cellulose ether is typically selected from the group of methyl cellulose, hydroxypropylmethylcellulose, hydroxybutylmethylcellulose, and combinations thereof. The second component is typically present in the uncured preform in an amount of from 0.5 to 10 parts by weight based on 100 parts by weight of solids in the uncured preform. A suitable second component is hydroxypropylmethylcellulose, commercially available under the trade name Methocel™ A4M from The Dow Chemical Company of Midland, Mich.

The organic binder is typically present in the uncured preform in an amount of from 0.5 to 25 parts by weight based on 100 parts by weight of solids in the uncured preform.

The inorganic binder of the binder component is typically silica. Without intending to be limited by theory, it is believed that the inorganic binder provides the preform 20 with strength. The inorganic binder is typically present in the uncured preform in an amount of from 2 to 10 parts by weight based on 100 parts by weight of solids in the uncured preform. The inorganic binder typically remains as solids in the preform 20 after curing or sintering. That is, the inorganic binder is typically present in the preform 20 in an amount of from 2 to 5 parts by volume based on 100 parts by volume of the preform 20. A suitable inorganic binder is silica, commercially available under the trade name Bindzil 1440 Colloidal Silica from Wesbond Corporation of Wilmington, Del.

The binder component is typically present in the uncured preform in an amount of from 5 to 35 parts by weight based on 100 parts by weight of solids in the uncured preform.

The uncured preform may further comprise an additive component. The additive component typically comprises a filler. One skilled in the art typically selects the filler to control the density of the preform 20. That is, the filler is typically included in the uncured preform according to the weight percent of ceramic particles and ceramic fibers in the uncured preform. The filler typically spaces out the ceramic particles and ceramic fibers to provide the preform 20 with desired density and to allow effective metal infiltration during formation of the metal matrix composite 24. The filler may be any filler known in the art. The filler is typically selected to burn off during heating, i.e., curing or sintering, of the preform 20. The filler is typically selected from walnut shell flour, cellulose fiber, air, and combinations thereof.

The filler is typically present in the uncured preform in an amount of from 0.5 to 20 parts by weight based on 100 parts by weight of solids in the uncured preform. A suitable filler is walnut shell flour, commercially available under from Ecoshell of Corning, Calif.

The additive component may further comprise an air entrainment agent. The air entrainment agent may be any air entrainment agent known in the art that is compatible with the second component of the binder component. One skilled in the art typically selects the air entrainment agent to increase air bubble content in the preform 20 and stabilize air bubble size to effect uniform air bubble distribution in the preform 20. Without intending to be limited by theory, it is believed that the air entrainment agent decreases surface tension, optimizes dispersability, and contributes to the formation of fine, stable air bubbles to provide the open, porous preform 20 that is receptive to metal infiltration. The air entrainment agent is typically present in the uncured preform in an amount of from 0.01 to 1 part by weight based on 100 parts by weight of solids in the uncured preform. A suitable air entrainment agent is commercially available under the trade name Silipon® RN from Hercules of Wilmington, Del.

The additive component may further comprise a surfactant. The surfactant may be any known surfactant in the art that is compatible with the second component of the binder component. One skilled in the art typically selects the surfactant to lubricate the ceramic fibers and ceramic particles. The surfactant is typically present in the uncured preform in an amount of from 0.01 to 1 part by weight based on 100 parts by weight of solids in the uncured preform.

The additive component may further comprise a foam stabilizing agent. The foam stabilizing agent may be any known foam stabilizing agent in the art that is compatible with the second component of the binder component. One skilled in the art typically selects the foam stabilizing agent to minimize the formation of undesired air bubbles in the uncured preform. The foam stabilizing agent is typically present in the uncured preform in an amount of from 0.01 to 1 part by weight based on 100 parts by weight of solids in the uncured preform. The additive component is typically present in the uncured preform in an amount of from 5 to 30 parts by weight based on 100 parts by weight of solids in the uncured preform.

The metal matrix composite 24 also includes a support element 40 formed of a metal that impregnates through the preform 20. The metal is heated to form the molten metal 38. In particular, when the support element 40 is being formed, molten metal 38 encapsulates the outer surface 26 of the preform 20 and impregnates the voids space 36 of the preform 20. It is to be appreciated that the metal may be a single metal or an alloy. Typically, the metal used in the manufacturing of the metal matrix composite 24 is selected based on a combination of a strength-to-weight ratio, a thermal conductivity and cost. Generally, a lightweight metal, as compared to the weight of iron, meeting the requirements for yield strength and thermal conductivity is selected.

The yield strength of the metal is typically about 100 to 200 MPa. The thermal conductivity of the metal is typically about 130 to 180 W/m*K. It is to be appreciated that the values for yield strength and thermal conductivity are all heavily dependent on the metal or the alloy used. The yield strength ranges for cast aluminum are from about 60 to 400 MPa, cast magnesium are from about 90 to 150 MPa, and cast titanium are from about 700 to 1,100 MPa. The thermal conductivity ranges for cast aluminum are from about 100 to 200 W/m*K, cast magnesium are from about 50 to 100 W/m*K, and cast titanium are from about 5 to 25 W/m*K. The cost of the metal is a consideration factored into the selection of the metal used. Typically, the metal is selected from the group of aluminum, magnesium, titanium, and combinations thereof. In one embodiment, the metal comprises aluminum. In another embodiment, the metal consists essentially of aluminum. In still another embodiment the metal consists of aluminum.

Once the molten metal 38 impregnates though the preform 20, the inner surface 28 of the preform 20 is defined by both the support element 40 and the preform 20 itself. Said differently, the inner surface 28 of the preform 20 comprises ceramic fibers, ceramic particles and the metal. The inner surface 28 of the preform 20 is also known as a wear surface of the metal matrix composite 24 in the industry. The preform 20 is present on the wear surface in an amount of from about 10 to 60%, more typically about 20 to 50%, and most typically about 32 to 38%, based on the surface area of the wear surface. It is to be appreciated that the preform 20 is uniformly distributed throughout the surface area of the wear surface of the metal matrix composite 24. The combination of the metal and the preform 20 of the wear surface provides excellent strength and wear resistance at elevated temperatures.

The present invention also relates to a method of forming the metal matrix composite 24. The method includes the step of extruding the composition through the multi-screw extruder to form an extrudate. The multi-screw extruder substantially randomly orients the ceramic fibers in three dimensions as the composition is extruded through the multi-screw extruder. Preferably, the steps of extruding the composition through the multi-screw extruder to form an extrudate and substantially randomly orienting the ceramic fibers in three dimensions are performed simultaneously. The specific steps of extruding the composition are set forth in copending U.S. patent application Ser. No. 12/174,982, filed concurrently herewith. A suitable multi-screw extruder is the 3+ RingExtruder™ commercially available from Century, Inc, of Traverse City, Mich.

The method also includes the step of forming the extrudate to a desired configuration for defining the preform 20. In one embodiment, the forming includes the use of a mandrel. The extrudate is wrapped around the mandrel to give the preform 20 a cylindrical shape, which in this embodiment is the desired configuration. It should be appreciated that the preform 20 may be of any suitable configuration. The operation of forming the preform 20 in to the cylindrical configuration is set forth in copending U.S. patent application Ser. No. 12/175,007, filed concurrently herewith.

The method also includes the step of heating the preform 20 for strengthening the preform 20. Typically, a heating apparatus is used as a heat source and the preform 20 is placed within the heating apparatus. It is to be appreciated that heating of the extrudate or preform 20 may take place in several steps and require the heating of the extrudate or preform 20 to several temperatures. It is also to be appreciated that prior to the step of heating, the preform 20 is known as uncured and after heating the preform 20 is known as cured. The specific steps of heating the extrudate are set forth in copending U.S. patent application Ser. No. 12/175,007, filed concurrently herewith. It is to be appreciated that the step of forming the extrudate to define the preform 20 is performed prior to the step of heating the preform 20.

Figure 4:
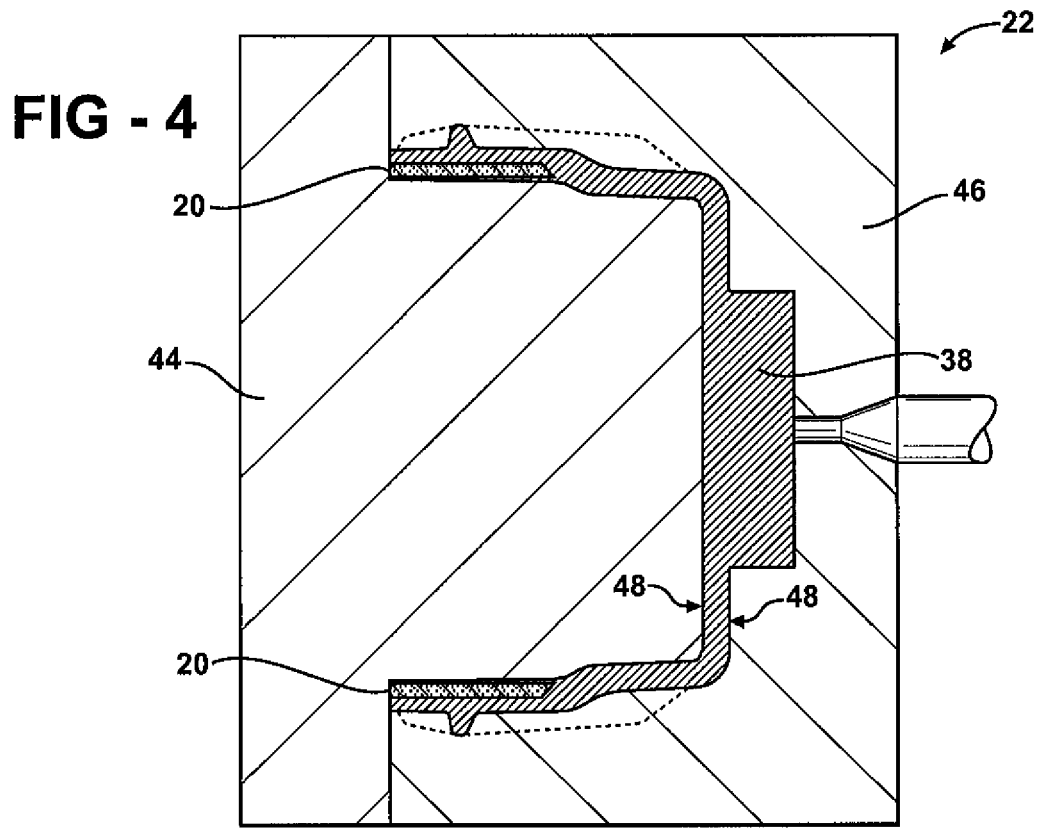
FIG. 4 is a cross-sectional view of the mold of FIG. 1 with the molten metal completely filling the cavity and infiltrating the preform with the metal to form a metal matrix composite.

The method further includes positioning the preform 20 within the mold 22, such as shown in FIG. 1. Preferably, the mold 22 has a male half 44 and a female half 46. Each of the halves 44, 46 define an inner mold surface 48. As shown in FIGS. 2-4, the mold 22 is designed such that joining of the male half 44 with the female half 46 defines a cavity 50. Said differently, the inner mold surface 48 of the male half 44 and female half 46 of the mold defines the cavity 50.

Figure 5:
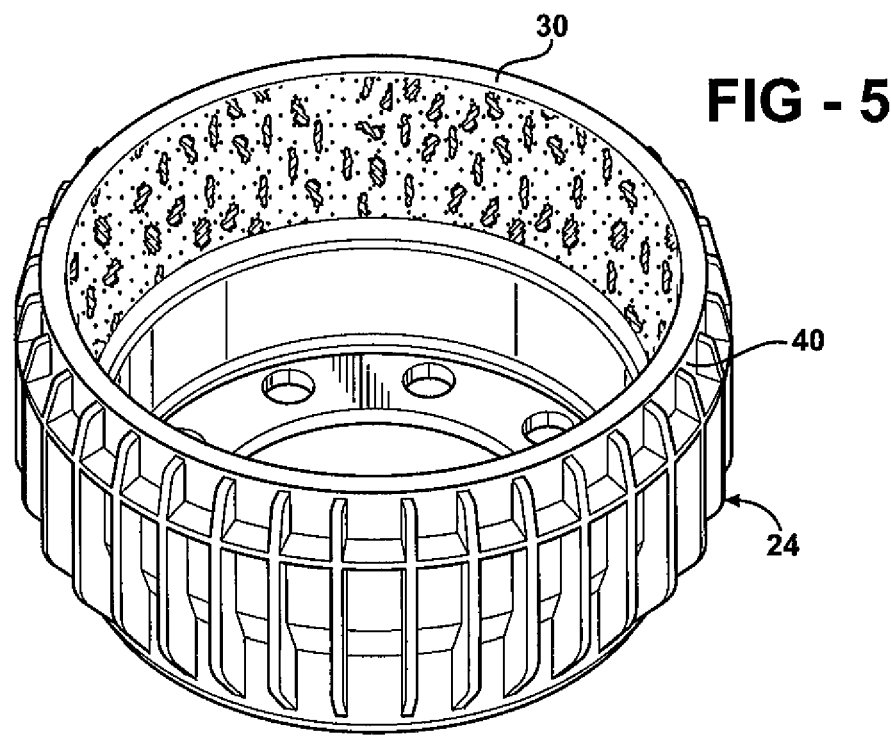
FIG. 5 is a perspective view of the metal matrix composite removed from the mold.

The inner mold surface 48 of the male half 44 and female half 46 of the mold 22 are configured to produce the support element 40 of the metal matrix composite 24 having a particular geometry. It should be appreciated that the mold 22 configuration shown in FIGS. 2-4 and the geometry of the metal matrix composite 24 shown in FIG. 5 is merely for illustrative purposes and in no way limits the scope of the subject invention.

In the illustrated embodiment, the preform 20 is positioned on the male half 44 of the mold 22 prior to joining the female half 46 with the male half 44. Specifically, the inner surface 28 of the preform 20 is mounted to the inner mold surface 48 of the male half 44 of the mold 22. The female half 46 of the mold 22 is joined with the male half 44 with the inner mold surface 48 of the female half 46 disposed about the preform 20 such that the preform 20 is entirely encapsulated within the cavity 50 of the mold 22. It is to be appreciated that the preform 20 occupies only a portion of the cavity 50 once disposed within the mold 22. Said differently, the volume of the cavity 50 is greater than the volume of the preform 20. It is also to be appreciated that the step of cooling the preform 20 is performed after the step of heating the extrudate and before the step of positioning the preform 20 within the mold 22.

The metal has a melting point defined as the temperature of the metal where the metal transitions from a solid state to a liquid state. The method further includes the step of heating the metal above the melting point of the metal for forming the molten metal 38.

As shown in FIGS. 2-4, the molten metal 38 is injected into the cavity 50 of the mold 22 under pressure. Preferably, the molten metal 38 is injected into the cavity 50 of the mold 22 under a first pressure until the molten metal 38 has substantially filled the cavity 50. It is to be appreciated that an initial speed of the molten metal 38 during infiltration is an important variable typically in the range of from about 2 to 25 in/sec. The first pressure can be adjusted to achieve the initial speed of the molten metal 38 within the given range. The molten metal 38 is then preferably injected into the cavity 50 under a second pressure that is greater than the first pressure until the preform 20 is impregnated with the molten metal 38. In the most preferred embodiment, the first pressure and the second pressure is from about 7,000 psi to 10,000 psi. The pressure, preferably the second pressure, of injecting the molten metal 38 into the mold 22 forces the molten metal 38 into the voids space 36 of the preform 20 for infiltrating the preform 20 with the molten metal 38 such as shown in FIG. 4.

Figure 6:
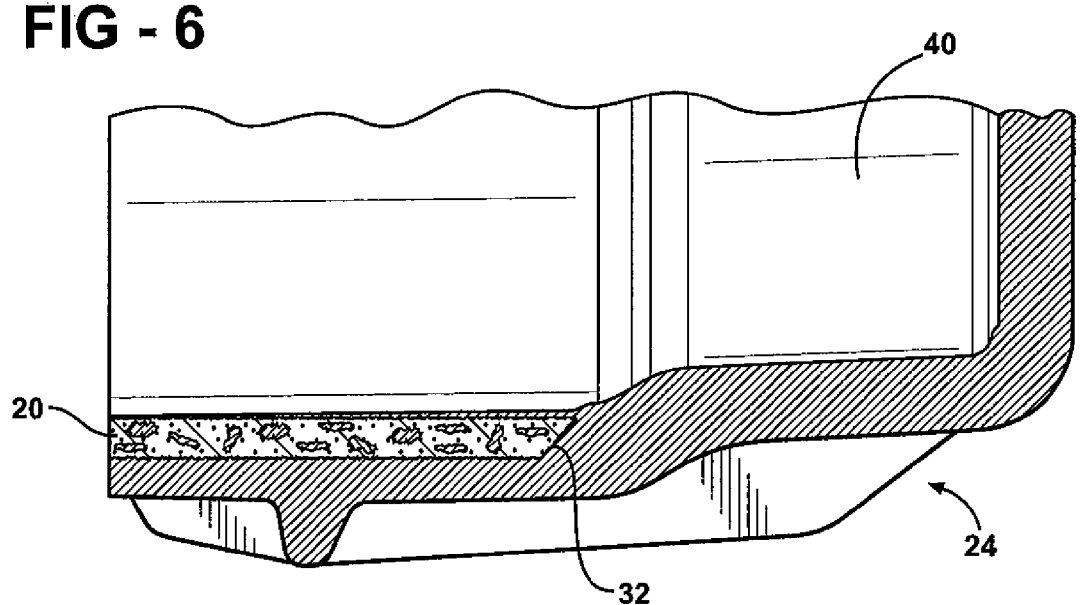
FIG. 6 is a fragmented cross-sectional view of the metal matrix composite after removal from the mold.
Figure 7:
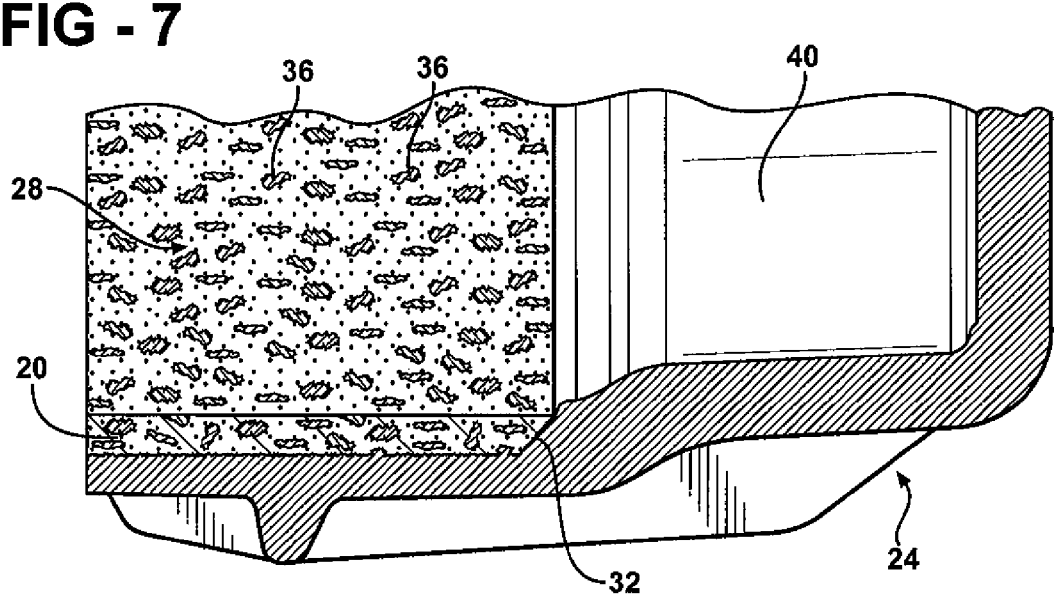
FIG. 7 is a fragmented cross-section view of the metal matrix composite after machining of the composite to a final configuration.
Figure 8:
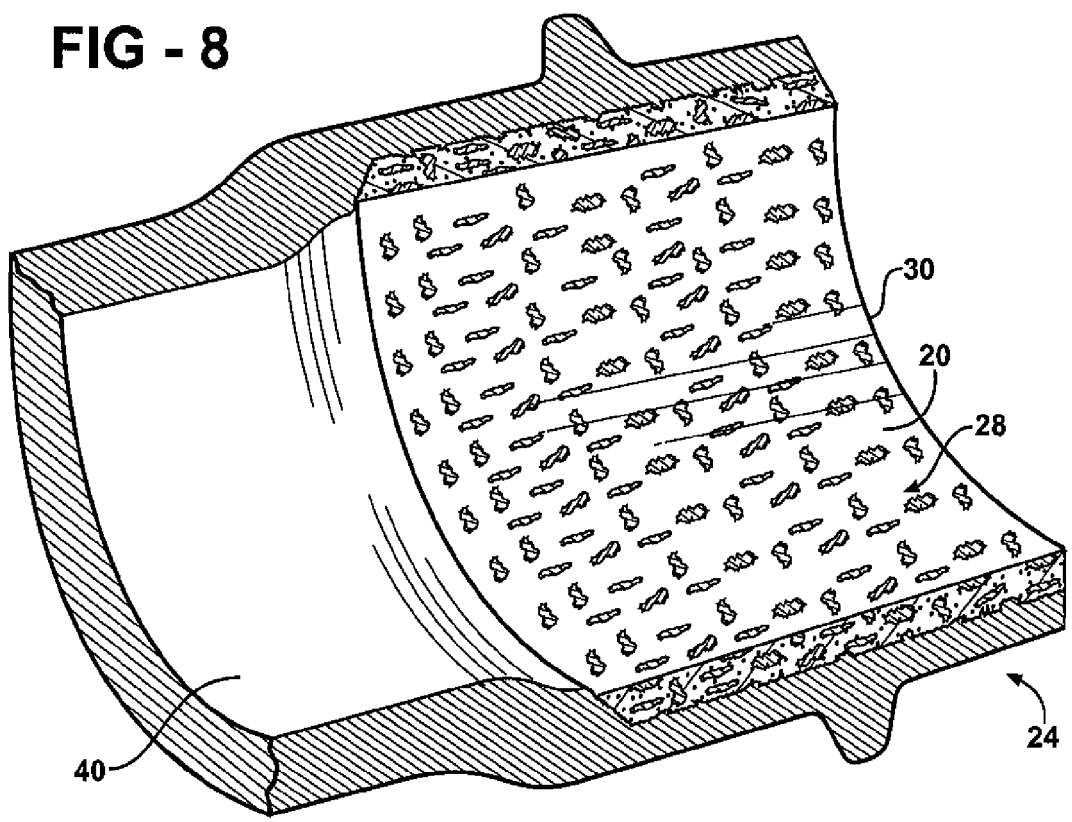
FIG. 8 is a fragmented perspective cross-sectional view of the metal matrix composite of FIG. 7.
Figure 9:
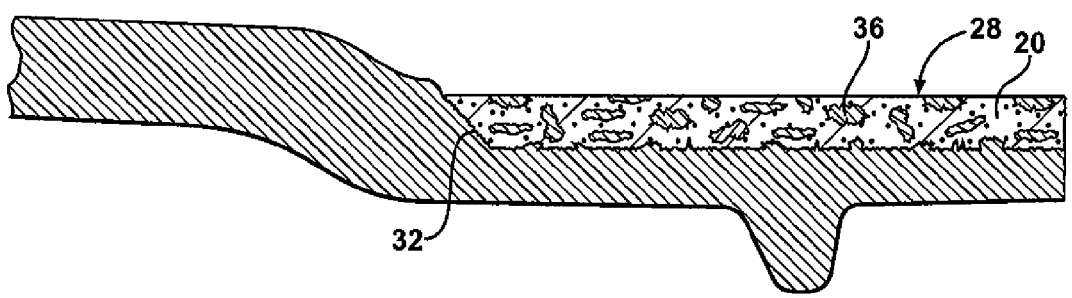
FIG. 9 is an enlarged fragmented cross-sectional view of the metal matrix composite of FIG. 7.

As best shown in FIGS. 6-7 and 9, the chamfer on the inward end 32 of the preform 20 minimizes the propagation of molten metal 38 onto the inner surface 28 of the preform 20. As discussed above, it is desirable to have the inner surface 28 be a combination of the ceramic fibers, ceramic particles and metal. Having the molten metal 38 flow over and cover the inner surface 28 of the preform 20 defeats the desirability of the preform 20 such that any over flow material is preferably machined off of the metal matrix composite 24. As best shown in FIG. 6, it has been found that a small amount of metal leaks onto the inner surface 28 of the preform 20. This small leakage, however, can be easily machined off the metal matrix composite 24 during the machining of the metal matrix composite 24 to a final configuration. The final configuration of the metal matrix composite 24 is shown in FIGS. 7-9.

The method also includes the step of cooling the molten metal 38 to below the melting point to solidify the molten metal 38 to define the metal matrix composite 24. The metal matrix composite 24 is removed from the mold 22, such as shown in FIG. 5, and machined to the final configuration, such as shown in FIGS. 7-9. Preferably, the step of injecting the molten metal 38 into the mold 22 under pressure is performed prior to the step of infiltrating the preform 20 with the molten metal 38 and prior to the step of cooling the molten metal 38 to below the melting point to solidify the molten metal 38 and form the metal matrix composite 24.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A method of forming a metal matrix composite by infiltrating a preform with a metal with the preform having an inner surface and an opposing outer surface and formed from a composition having ceramic particles and ceramic fibers utilizing an extruder and a mold having a cavity, said method comprising the steps of:
    extruding the composition through the extruder to form an extrudate;
    substantially randomly orienting the ceramic fibers in three dimensions as the composition is extruded through the extruder;
    forming the extrudate to a desired configuration for defining the preform;
    positioning the preform within a portion of the cavity of the mold;
    heating the metal to form a molten metal;
    injecting the molten metal into the cavity of the mold adjacent the outer surface of the preform under pressure;
    infiltrating the preform with the molten metal through the outer surface to the inner surface of the preform; and
    cooling the molten metal to solidify the molten metal and define the metal matrix composite having a wear surface formed of the infiltrated inner surface with exposed metal, ceramic particles and ceramic fibers.

2. The method as set forth in claim 1 further including the step of drying the preform to remove water from the preform.

3. The method as set forth in claim 1 further including the step of baking the preform to remove organic binders and fillers from the preform.

4. The method as set forth in claim 1 further including the steps of heating the preform and subsequently cooling the preform before the step of positioning the preform within the mold.

5. The method as set forth in claim 1 wherein the steps of extruding the composition through the extruder and substantially randomly orienting the ceramic fibers in three dimensions are performed simultaneously.

6. The method as set forth in claim 1 wherein the step of injecting the molten metal into the cavity of the mold is preformed prior to the step of infiltrating the ceramic preform with the molten metal.

7. The method as set forth in claim 1 wherein the step of injecting the molten metal into the cavity of the mold is further defined as injecting the molten metal into the cavity of the mold under a first pressure until the molten metal has substantially filled the cavity.

8. The method as set forth in claim 7 further including the step of injecting the molten metal into the cavity of the mold under a second pressure that is greater than the first pressure until the preform is impregnated with the molten metal.

9. The method as set forth in claim 1 wherein the step of infiltrating the ceramic preform with the molten metal is performed prior to cooling the molten metal to below the melting point to solidify the molten metal and form the metal matrix composite.

10. The method as set forth in claim 1 further including the step of machining the metal matrix composite to a final configuration.

11. The method as set forth in claim 1 further including the step of forming a chamfer on an inward end of the preform to minimize the propagation of molten metal onto an inner surface of the preform.

12. The method as set forth in claim 1 wherein the step of cooling the molten metal to below the melting point is further defined as cooling the molten metal to below the melting point to solidify the molten metal and define the metal matrix composite having a wear surface with the preform present on the wear surface in an amount of from about 10 to 60% based on a surface area of the wear surface.

13. The method as set forth in claim 1 wherein the step of cooling the molten metal to below the melting point is further defined as cooling the molten metal to below the melting point to solidify the molten metal and define the metal matrix composite having a wear surface with the preform present on the wear surface in an amount of from about 32 to 38% based on a surface area of the wear surface.

14. The method as set forth in claim 1 wherein the step of substantially randomly orientating the ceramic fibers in three dimensions is further defined as randomly orienting greater than 90 out of 100 ceramic fibers in three dimensions as the composition is extruded through the extruder.

15. A method of forming a brake drum for a vehicle with the brake drum comprising a preform impregnated by a support element wherein the preform and the support element define a wear surface of the brake drum, said method utilizing an extruder and a mold having an inner mold surface defining a cavity and comprising the steps of:
    extruding a composition comprising ceramic particles and ceramic fibers through the extruder to form an extrudate;
    substantially randomly orientating the ceramic fibers of the composition in three dimensions as the composition is extruded through the extruder;
    shaping the extrudate to define a preform having an inner surface and an opposing outer surface;
    positioning the preform within a portion of the cavity of the mold such that the inner surface of the preform contacts the inner mold surface;
    injecting a molten metal into the cavity of the mold adjacent the outer surface of the preform under pressure;
    infiltrating the preform with the molten metal through the outer surface to the inner surface of the preform; and
    cooling the molten metal to below the melting point to solidify the molten metal and produce the support element that impregnates the preform to define the brake drum having the wear surface formed of the infiltrated inner surface with exposed metal, ceramic particles, and ceramic fibers.

16. The method as set forth in claim 15 wherein the step of cooling the molten metal to below the melting point is further defined as cooling the molten metal to below the melting point to solidify the molten metal and produce the support element that impregnates the preform to define the brake drum having the wear surface with the preform present on the wear surface in an amount of from about 10 to 60% based on a surface area of the wear surface.

17. The method as set forth in claim 15 wherein the step of cooling the molten metal to below the melting point is further defined as cooling the molten metal to below the melting point to solidify the molten metal and produce the support element that impregnates the preform to define the brake drum having the wear surface with the preform present on the wear surface in an amount of from about 32 to 38% based on a surface area of the wear surface.

18. The method as set forth in claim 15 further including the step of machining the wear surface of the brake drum to a final configuration.

19. The method as set forth in claim 15 wherein the step of substantially randomly orienting the ceramic fibers in three dimensions is further defined as randomly orienting greater than 90 out of 100 ceramic fibers in three dimensions as the composition is extruded through the extruder.

20. A method of forming a metal matrix composite by infiltrating a preform with a metal with the preform having an inner surface and an opposing outer surface and formed from a composition having ceramic particles, a cellulous ether and ceramic fibers utilizing an extruder and a mold having a cavity, said method comprising the steps of:
    extruding the composition through the extruder to form an extrudate;
    substantially randomly orienting the ceramic fibers in three dimensions as the composition is extruded through the extruder;
    forming the extrudate to a desired configuration for defining the preform;
    heating the preform to burn off the cellulous ether;
    positioning the preform within a portion of the cavity of the mold;
    heating the metal to form a molten metal;
    injecting the molten metal into the cavity of the mold adjacent the outer surface of the perform under pressure;
    infiltrating the preform with the molten metal through the outer surface to the inner surface of the preform;
    cooling the molten metal to below the melting point to solidify the molten metal and define the metal matrix composite.

21. The method as set forth in claim 20 wherein the step of substantially randomly orienting the ceramic fibers in three dimensions is further defined as randomly orienting greater than 90 out of 100 ceramic fibers in three dimensions as the composition is extruded through the extruder.

22. The method as set forth in claim 20 wherein the steps of extruding the composition through the extruder and substantially randomly orienting the ceramic fibers in three dimensions are performed simultaneously.

23. The method as set forth in claim 20 wherein the cellulose ether is selected from the group of methyl cellulose, hydroxypropylmethylcellulose, hydroxybutylmethylcellulose, and combinations thereof.

* * * * *